United States Patent
Gerber et al.

(10) Patent No.: US 11,545,844 B2
(45) Date of Patent: Jan. 3, 2023

(54) LIMITING VOLTAGE SPIKES DURING ELECTRIC VEHICLE CHARGING

(71) Applicant: Proterra Operating Company, Inc., Burlingame, CA (US)

(72) Inventors: John A. Gerber, Greer, SC (US); Seamus T. McGrath, Simpsonville, SC (US); Kevin J. Siniard, Greenville, SC (US); Roger A. Innes, Asheville, NC (US)

(73) Assignee: Proterra Operating Company, Inc., Burlingame, CA (US)

( * ) Notice: Subject to any disclaimer, the term of this patent is extended or adjusted under 35 U.S.C. 154(b) by 815 days.

(21) Appl. No.: 15/699,405

(22) Filed: Sep. 8, 2017

(65) Prior Publication Data

US 2019/0081489 A1 Mar. 14, 2019

(51) Int. Cl.
*H02J 7/00* (2006.01)

(52) U.S. Cl.
CPC ........ *H02J 7/00308* (2020.01); *H02J 7/0013* (2013.01); *B60L 2200/18* (2013.01); *H02J 7/00304* (2020.01); *H02J 2310/48* (2020.01); *Y02T 10/7072* (2013.01)

(58) Field of Classification Search
CPC ..... Y02T 90/14; Y02T 90/128; Y02T 90/163; Y02T 10/7005; Y02T 10/7088; H02J 7/0029; H02J 7/007; H02J 7/00304; H02J 7/00308; H02J 7/0013; H02J 2310/48; B60L 53/665; B60L 2200/18
USPC ................. 320/104, 109, 134, 162
See application file for complete search history.

(56) References Cited

U.S. PATENT DOCUMENTS

| | | | | |
|---|---|---|---|---|
| 5,206,579 | A * | 4/1993 | Kawate | H02J 7/007184 320/155 |
| 9,260,025 | B1 * | 2/2016 | McGrath | F24D 15/00 |
| 9,352,658 | B2 | 5/2016 | Morris et al. | |
| 9,669,719 | B1 * | 6/2017 | Gerber | H02J 7/0071 |
| 10,442,301 | B2 * | 10/2019 | Gerber | H02J 7/04 |
| 2011/0062913 | A1 * | 3/2011 | Lin | H02J 2207/40 320/101 |
| 2012/0007553 | A1 * | 1/2012 | Ichikawa | G07C 5/085 320/109 |
| 2013/0002197 | A1 * | 1/2013 | Hernandez | B60L 11/1824 320/109 |
| 2013/0002200 | A1 * | 1/2013 | Kobayashi | H02J 7/045 320/112 |
| 2013/0193918 | A1 | 8/2013 | Sarkar et al. | |
| 2013/0207608 | A1 * | 8/2013 | Kawashima | B60L 53/65 320/109 |
| 2014/0266038 | A1 * | 9/2014 | Gibeau | B60L 53/14 320/109 |
| 2015/0028795 | A1 * | 1/2015 | Cho | H02J 7/35 320/101 |

(Continued)

Primary Examiner — Edward Tso
Assistant Examiner — Aaron Piggush
(74) Attorney, Agent, or Firm — Bookoff McAndrews, PLLC (57) ABSTRACT

A method of charging an electric vehicle includes receiving data indicative of the power source system voltage during charging, determining a maximum voltage limit of the power source, and setting the maximum voltage limit as the limiting voltage of the power source. The maximum voltage limit may be the maximum permissible value of the system voltage during the charging.

19 Claims, 5 Drawing Sheets

(56) References Cited

U.S. PATENT DOCUMENTS

| | | | |
|---|---|---|---|
| 2015/0303713 A1* | 10/2015 | Toivola | H02J 7/007 |
| | | | 320/162 |
| 2016/0297310 A1* | 10/2016 | Kojima | B60L 11/1816 |
| 2017/0182898 A1 | 6/2017 | McGrath et al. | |
| 2017/0274784 A1* | 9/2017 | Nagakura | B60L 58/10 |
| 2017/0297880 A1* | 10/2017 | Kirk | B60L 3/12 |
| 2017/0305289 A1* | 10/2017 | Meitinger | B60L 58/19 |
| 2018/0201147 A1* | 7/2018 | Shin | H02J 50/10 |
| 2018/0257495 A1* | 9/2018 | Miller | B60L 3/003 |

* cited by examiner

LIMITING VOLTAGE SPIKES DURING ELECTRIC VEHICLE CHARGING

TECHNICAL FIELD

The current disclosure relates to systems and methods for limiting voltage spikes in an electric vehicle energy storage system during charging.

BACKGROUND

In an electric vehicle, energy may be stored in an energy storage system (ESS), that includes one or more batteries. The ESS powers one or more electric motors used to propel the vehicle. When the energy stored in the ESS decreases, it may be charged (or recharged) by connecting the vehicle to an external power supply. In some cases, changes in load conditions at the vehicle or the charging system may result in a spike in voltage at the ESS. This sudden increase in voltage may, in some cases, cause the ESS to enter an undesirable operating region.

Embodiments of the current disclosure may alleviate the problem discussed above and/or other problems in the art. The scope of the current disclosure, however, is defined by the attached claims, and not by the ability to solve any specific problem.

SUMMARY

Embodiments of the present disclosure relate to systems and methods for limiting voltage spikes in an electric vehicle energy storage system during charging. Each of the embodiments disclosed herein may include one or more of the features described in connection with any of the other disclosed embodiments.

In one embodiment, a method of charging an electric vehicle is disclosed. The method may include electrically connecting the electric vehicle to an external power source for charging, and receiving data indicative of a system voltage of the power source during the charging. The method may also include determining a maximum voltage limit of the power source based on the received system voltage. The maximum voltage limit may be the maximum permissible value of the system voltage during the charging. The method may also include setting the determined maximum voltage limit as a limiting voltage of the power source.

In another embodiment, a method of charging an electric vehicle is disclosed. The method may include charging the electric vehicle using power from an external power source, and receiving, at the electric vehicle, data indicative of a system voltage of the power source during the charging. The method may also include determining, at the electric vehicle, a maximum voltage limit as a value higher than the received system voltage by a predetermined amount. The maximum voltage limit may be the maximum permissible value of the system voltage of the power source during the charging. The method may further include transmitting the determined maximum voltage limit from the electric vehicle to the power source, and setting the determined maximum voltage limit as a limiting voltage of the power source.

In yet another embodiment, a method of charging an electric vehicle is disclosed. The method may include charging the electric vehicle using power from an external power source, and receiving first data. The first data may be indicative of a system voltage of the power source at a first time during the charging. The method may also include determining a maximum voltage limit based on the received first data. The maximum voltage limit may be the maximum permissible value of the power source system voltage during the charging. The method may also include setting the determined maximum voltage limit as a limiting voltage of the power source, and receiving second data. The second data may be indicative of the power source system voltage at a second time during the charging, the second time being later than the first time. The method may further include determining a revised maximum voltage limit based on the received second data, and updating the power source maximum voltage limit using the determined revised maximum voltage limit.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes systems and methods for limiting voltage spikes in the energy storage system of an electric vehicle during charging. While principles of the current disclosure are described with reference to conductive charging of an electric bus, it should be understood that the disclosure is not limited thereto. Rather, the systems and methods of the present disclosure may be broadly used for charging of any electric vehicle (motorcycle, trains, cars, plane, etc.) in any manner (conductively, inductively, etc.). Further, as used herein, the term electric vehicle is used to refer to any vehicle that uses an electric motor, alone or in conjunction with other power generation systems, for propulsion (e.g., fully electric vehicles, hybrid vehicles, etc.).

Figure 1A:
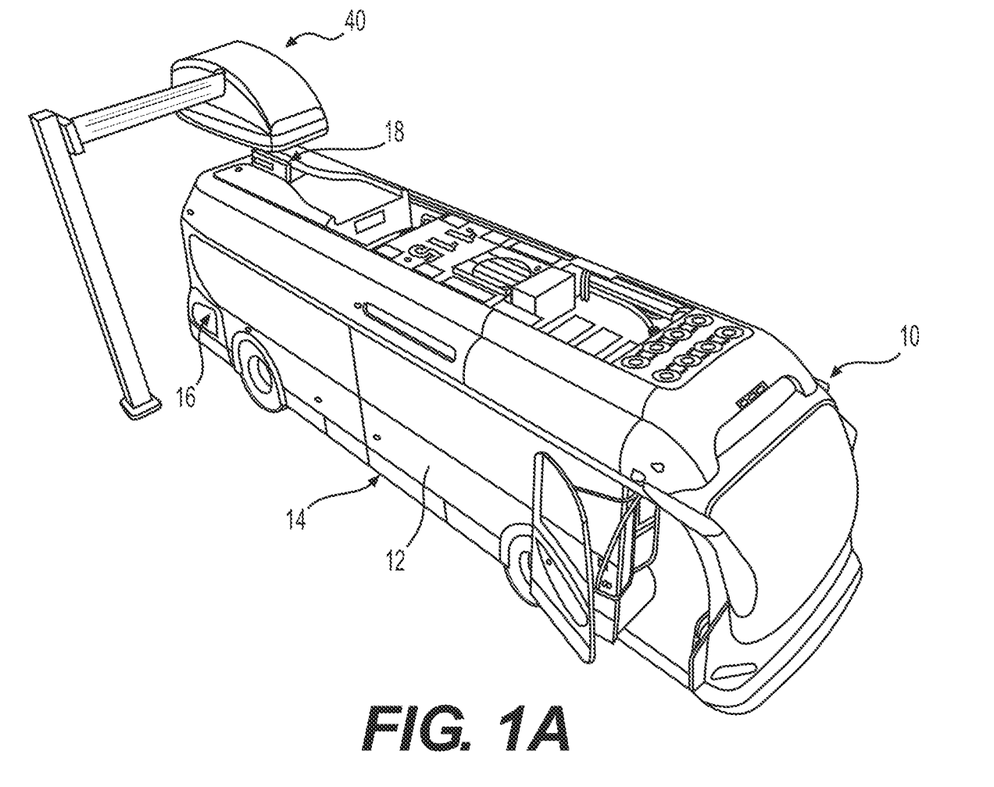
FIG. 1A illustrates an exemplary electric bus of the current disclosure.

FIG. 1A illustrates an electric vehicle in the form of a bus 10. Electric bus 10 may include a body 12 enclosing a space for passengers. In general, body 12 may have any size, shape, and configuration, and may be made of any material (metal, composite, etc.). In some embodiments, bus 10 may be a low-floor electric bus. As is known in the art, in a low-floor bus, there are no steps at the front and/or the back doors of the bus. In such a bus, the floor of the bus 10 is positioned close to the road surface (e.g., about 12-16 inches) to ease passenger exit and entry. In this disclosure, relative terms such as "about," "substantially," "approximately," etc. are used to indicate a possible variation of ±10% in the stated numeric value.

Bus 10 may be propelled by one or more electric motors (not shown). An energy storage system (ESS) of the bus may store electrical energy to power the motor(s). The ESS may include a battery system 14 and other electrical/electronic components (wires, fuses, etc.) that support the battery system 14. For simplicity, the ESS will be referred to as the battery system 14 in this disclosure. The battery system 14 may include a plurality of batteries electrically connected together in any manner. These batteries may have any chemistry (lithium titanate oxide (LTO), nickel manganese cobalt (NMC), etc.) and construction. In some embodiments, the efficiency of the battery system 14 may be lower at colder temperatures. The ESS may include one or more heaters 24 (shown in FIG. 2) to heat the battery system 14. In addition to providing power to the electric motor(s) and the heaters 24, the battery system 14 may provide power to other power consuming accessories (HVAC system, lights, defroster, etc.) of the bus 10. When the energy stored in the battery system 14 decreases, the battery system 14 is charged (or recharged).

Battery system 14 may be charged in any known manner (i.e., conductively, inductively, etc.). To conductively charge the battery system 14, the bus 10 is physically connected to an external energy source (e.g., utility grid, external energy storage system, etc.) to transfer electrical energy from the energy source to the battery system 14. In some embodiments, the battery system 14 may enable fast charging. By fast charging, the battery system 14 may be recharged (e.g., to greater than about 95% state of charge) in a short time (e.g., less than or equal to about 10 minutes). However, in some embodiments, the bus 10 may be charged more slowly. While inductively charging the battery system 14, energy may be transferred to an energy receiver of the bus from an external charging pad (or energy transmitter) in a wireless manner. The battery system 14 may be conductively charged by electrically connecting an external energy source to a charge port 16 or a charging interface 18 of bus 10. In some embodiments, as illustrated in FIG. 1A, the charge port 16 may be positioned on a side surface of the bus 10, and the charging interface 18 may be positioned on the roof of the bus 10. However, these locations are only exemplary, and the charge port 16 and the charging interface 18 may be positioned at any location of the bus 10.

To charge the bus 10 using the charging interface 18, when the bus 10 is positioned below an over-hanging charge head of a charging station 40 (see FIG. 1A), the charge head automatically descends and physically connects with electrodes of the charging interface 18. When electrical contact is established between the charging interface 18 and the charge head, current is directed into the bus 10 to charge the battery system 14. After charging is complete, the charge head automatically retracts (i.e. ascends) and allows the bus 10 to proceed along its route. U.S. Pat. No. 9,352,658; U.S. Patent Publication No. 2013/0193918, and U.S. patent application Ser. No. 14/980,697, commonly-assigned to the assignee of the current application, describe exemplary embodiments of the charging interface 18 and corresponding charging processes. These references are incorporated by reference in their entirety herein.

Figure 1B:
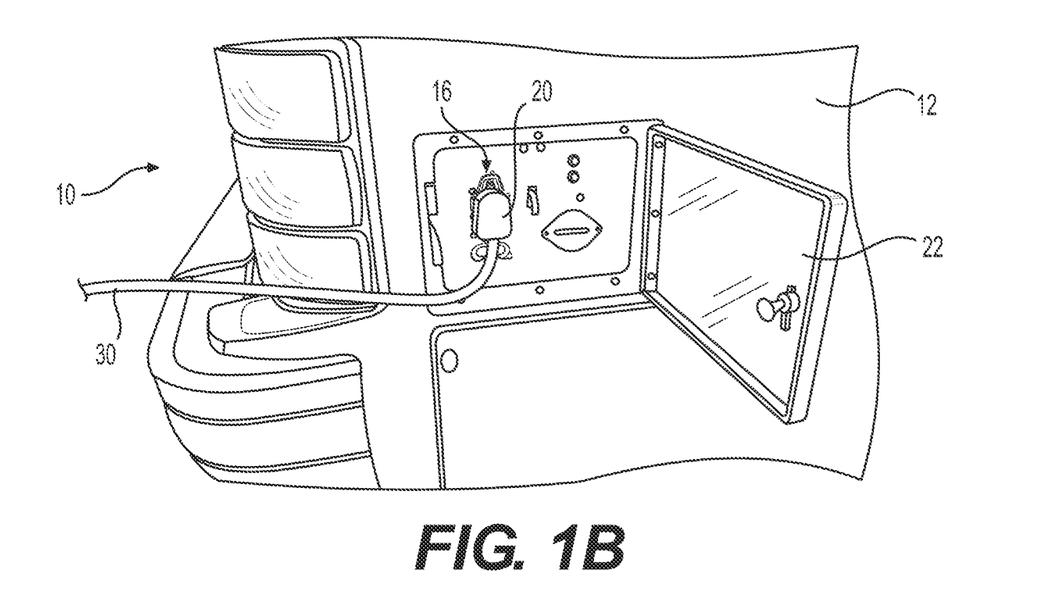
FIG. 1B illustrates an exemplary charge port of the bus of FIG. 1.

To charge the bus 10 using the charge port 16, a connector 20 of a cable 30 connected to the external energy source is plugged into the charge port 16. FIG. 1B is an illustration of a rear portion of the bus 10 with the connector 20 of the cable 30 plugged into the charge port 16. In some embodiments, the charge port 16 and the mating connector 20 may be part of a combined charging system/standard (CCS) that conforms to an industry standard (SAE, IEC, etc.). However, in general, the charge port 16 and the mating connector 20 may be of any type and form (custom design or standardized). In some embodiments, as illustrated in FIG. 1B, to protect the charge port 16 from the environment (rain, snow, debris, etc.), a hinged lid 22 may cover the charge port 16 when not in use. Typically, the bus 10 is charged using the roof-top charging interface 18 ("overhead charging") when the bus 10 is travelling on a route, and the bus 10 is charged through the charge port 16 ("depot charging") when it is parked in a bus depot (e.g., at night, between trips, etc.). Some buses may include both the charge port 16 and the charging interface 18, while other buses may only include only one of these components. Although the systems and methods of the current disclosure are applicable to both overhead charging and depot charging, in the discussion below, for the sake of brevity, only an exemplary embodiment of depot charging will be described.

Figure 2:
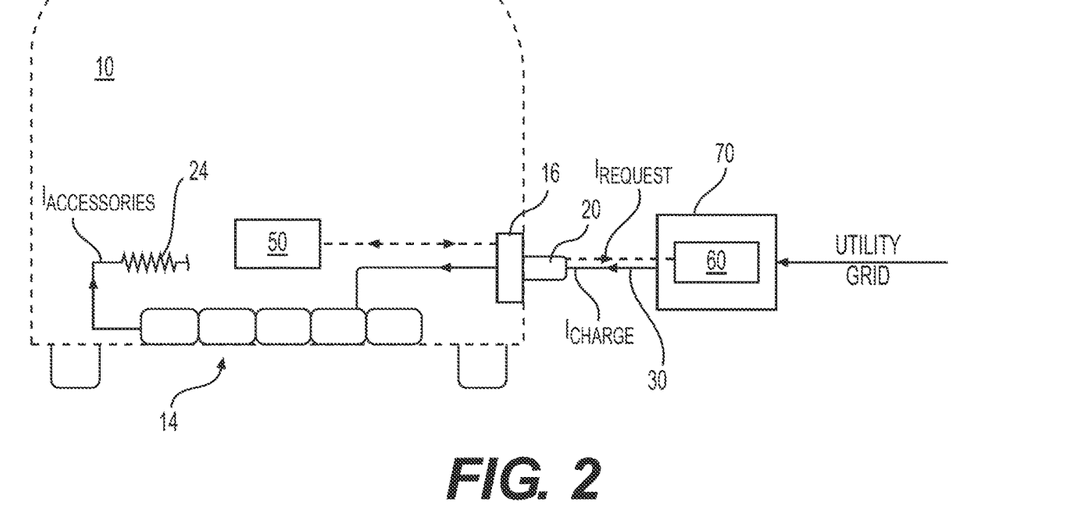
FIG. 2 is a schematic illustration of charging the bus using the charge port.

FIG. 2 is a schematic illustration of bus 10 being charged by plugging the connector 20 of cable 30 to its charge port 16. The charge port 16 is electrically connected to the battery system 14 of bus 10, and cable 30 is electrically connected to the utility grid (or to another external energy source). Thus, when the connector 20 of cable 30 is plugged into the charge port 16 of the bus 10, and charging activated, the battery system 14 is charged using external current. The cable 30 may be connected to the utility grid directly (e.g., cable 30 is plugged into an electrical socket in a wall, etc.) or via a charger 70 (as illustrated in FIG. 2). The charger 70 may include a console that may house electrical/electronic components (e.g., rectifier, power converter, switches, fuses, controllers, etc.) configured to receive grid power, convert the power to a form that may be supplied to the bus 10 (e.g., AC to DC, etc.), and supply the converted power to the charge port 16 through the connector 20.

In general, the bus 10 may be charged using AC or DC current. In some embodiments, single phase or three-phase AC current from the utility grid is converted into DC current (e.g., in charger 70) and then directed to the bus through the charge port 16. In some embodiments, DC current from an external energy storage system (e.g., battery, capacitor, etc.) may be directed into the bus 10 for charging, and in some embodiments AC current from the grid may be directed into the bus 10 and converted to DC in the bus 10. The charging process is controlled by one or more control systems. These control systems may be housed in one or both of the bus 10 and the charger 70. In some embodiments, as illustrated in FIG. 2, the control systems may include an electric vehicle charging controller (EVCC 50) on the bus 10 and a supply equipment charge controller (SECC 60) located in the charger 70. In some embodiments, both the EVCC 50 and the SECC 60 may be incorporated in a single control system positioned inside or outside the bus 10 (e.g., in the bus, charger, a central remote location, etc.). The EVCC 50 and the SECC 60 may control the charging operation of the bus alone or in conjunction with other controllers (e.g., battery management system or BMS of bus 10).

In some embodiments, the EVCC 50 and SECC 60 may include multiple control units and algorithms that are configured to charge the bus 10 using a charging protocol (an industry standard charging protocol such as, for example, SAE J1772, CHAdeMO, etc., or a custom charge protocol). As known to people skilled in the art, a charge protocol defines the rules that govern information exchange and energy transfer between the bus 10 and the charger 70 during the charging process. In some embodiments, the EVCC 50 (alone or in conjunction with the BMS) may monitor various operating parameter data (e.g., current consumption, voltage, temperature, etc.) of the battery system 14 during the charging process, and transmit data (e.g., current request, etc.) to the SECC 60. For example, in some embodiments, the EVCC 50 may monitor the total current ($I_{Total}$) consumed by the bus 10 at any time, and request this value of current from the SECC 60 as a current request ($I_{Request}$). Based on this request, the SECC 60 may direct charge current ($I_{Charge}$) into the bus 10 through the charge port 16. $I_{Charge}$ may be substantially equal to $I_{Request}$ or it may be different from $I_{Request}$ (e.g., $I_{Charge}$ may be less than or greater than $I_{Request}$).

The total current ($I_{Total}$) consumed by the bus 10 at any time during charging may be the sum of the current used to recharge the battery cells of the battery system 14 (i.e., the current actually used in recharging the battery system 14) ($I_{Battery}$) and the current used to power on-board accessories ($I_{Accessories}$) that are on during charging. That is, in some embodiments, the current request $I_{Request}$ may equal $I_{Total}$, which equals $I_{Battery}+I_{Accessories}$. While charging, during some time periods, current supplied by the charger 70 ($I_{Charge}$) may not actually be used to recharge the battery system 14 (i.e., $I_{Battery}=0$). Instead, this current ($I_{Charge}$) may only be used to power onboard accessories. The process of using charger current to power on-board accessories is referred to as preconditioning (e.g., by preheating the passenger cabin to the desired temperature, preheating the battery system prior to charging, etc.). Preconditioning the bus 10 using grid power (as opposed to battery power) conserves battery power and thus increases efficiency. In some embodiments, when ambient temperature is low (e.g., below a threshold temperature), the heater 24 may be activated to heat the battery system 14 (e.g., above a threshold temperature) before the battery system 14 is recharged. In such cases, until the battery system 14 is heated to above the threshold temperature, $I_{Charge}$ may only be used to power the heater 24. In some such cases, the EVCC 50 may only request just enough current from the SECC 60 to power the heater 24 (i.e., $I_{Request}=I_{Total}=I_{Accessories}$).

In some cases, as illustrated in FIG. 2, all the current from the charger 70 (i.e., $I_{Charge}$) may be first directed into the battery system 14, and the current needed to power the accessories ($I_{Accessories}$) may be discharged from the battery system 14. In such cases, when current is not used to charge the cells of the battery system 14 (i.e., when $I_{Battery}=0$), the current directed into the battery system 14 (from the charger 70) will be substantially equal to the current discharged from the battery system 14 to power the accessories. However, in some embodiments, the battery system 14 may be wired such that the portion of current directed to the accessories will be directed to the accessories external to the battery system 14.

The strategy of requesting just enough current from the charger 70 to charge the batteries and power onboard accessories (i.e., $I_{Request}=I_{Total}$) is called load-following control. Load-following may improve the efficiency of the charging operation. When the load requirements of the bus 10 change (i.e., when accessories are turned on and off), the EVCC 50 may detect the change, and send a new current request to the SECC 60. When an on-board accessory, or load, rapidly changes (e.g., when heater 24 is switched off), there will be a lag time before the SECC 60 compensates for the changed load. For example, when the heater 24 is switched off, there may be a finite lag time (in some embodiments, between about 0.5-1 second (or more)) before the SECC 60 reduces the current directed to the bus 10 in response to the reduced load. This lag time is the result of delays inherent in the control algorithm (data acquisition and communication delays, etc.).

In cases where the impedance (or resistance R) of the battery system 14 is high (e.g., at low temperature and/or when the state of charge (SoC) of the battery system 14 is low or high, etc.), the lag time will cause the system voltage (V) to increase significantly (or surge) for a short time (and cause a resulting increase in current) before the voltage stabilizes to a new lower value. In some embodiments, the voltage surge ($\Delta V$) may be about 10 V-20 V (or even more) for expected load changes in the bus before the voltage V stabilizes to a new value. This surge in voltage may reduce the lifespan of the battery system 14, or in some embodiments, cause the battery system 14 to enter an undesired operating region.

Figure 3A:
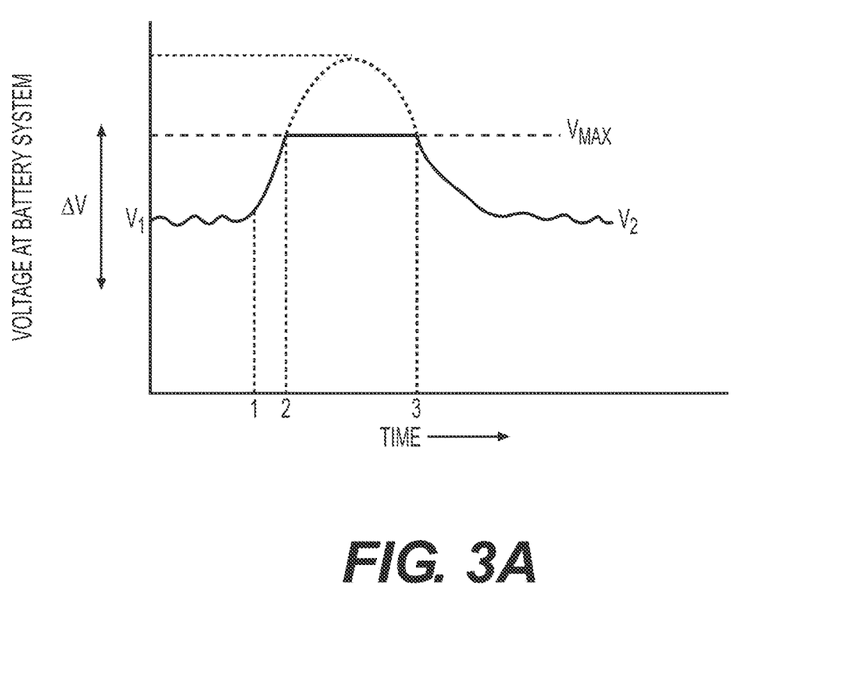
FIGS. 3A-3C are schematic graphs that illustrate the effect of implementing a maximum voltage limit during charging.
Figure 3B:
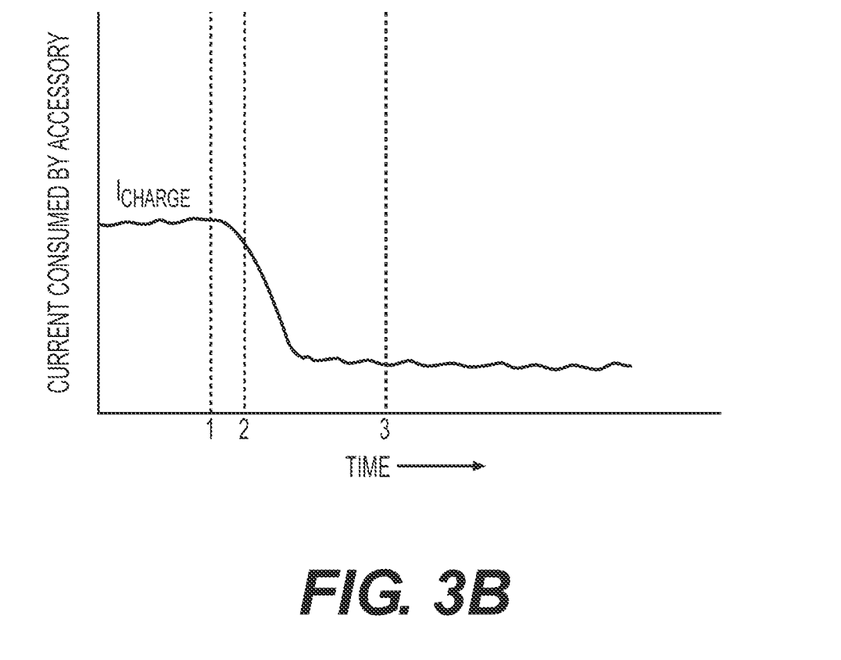
Figure 3C:
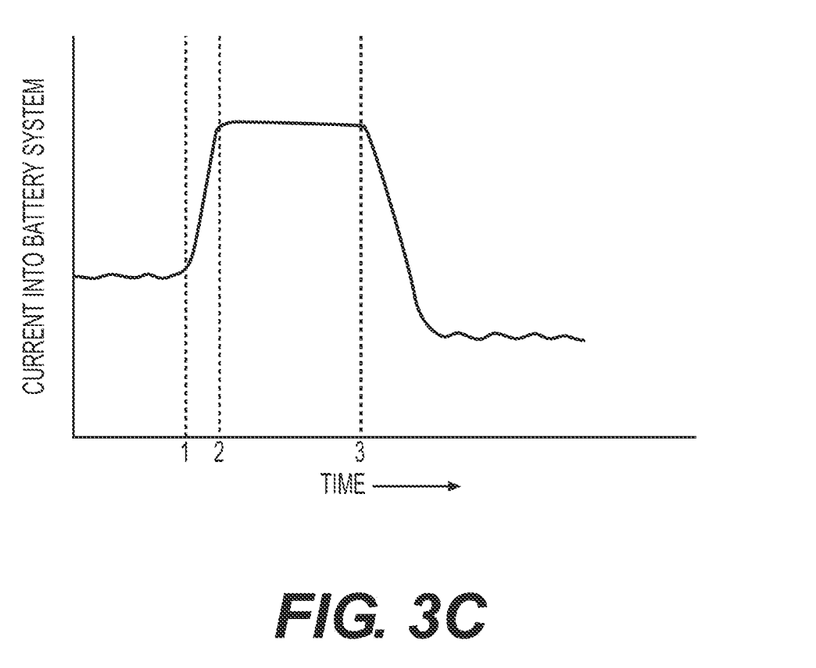

To minimize voltage surge, in some embodiments, the control strategy may include implementation of a maximum voltage limit ($V_{MAX}$) on the charger 70. When a maximum voltage limit ($V_{MAX}$) is implemented in the charger 70, the SECC 60 prevents the system voltage from increasing above $V_{MAX}$ (during a voltage surge) by trimming (filtering, blocking, clamping, etc.) voltages having a magnitude greater than $V_{MAX}$. In some embodiments, the maximum voltage limit ($V_{MAX}$) may be a value programmed into the SECC 60. FIGS. 3A-3C are schematic graphs that illustrate the effect of implementing a maximum voltage limit ($V_{MAX}$) on the charger 70. FIG. 3A is a simplified illustration of the voltage seen at the battery system 14 over a representative time window. In some cases, this graph is also indicative of the voltage seen at the charger. In steady-state, the voltage at the charger will be marginally higher than the voltage at the battery. In a transient, the voltage at the battery may be higher than the voltage at the charger. In some embodiments, the disclosed scheme utilizes data observed at the charger along with the charger's very fast response time, to minimize over-voltage conditions at the battery system. FIG. 3B is a representation of the current consumed by the accessory or load on the bus 10 during this time, and FIG. 3C illustrates the current (from the charger 70) entering the battery system 14. Note that the x-axes of FIGS. 3A-3C represent a common time window and the labels 1, 2, and 3 represent common time points in these graphs. With reference to these figures, during a charging event, the SECC 60 may provide charge current ($I_{Charge}$) to the bus 10 at a system voltage of $V_1$. When the electrical load on the bus 10 changes suddenly (e.g., when an accessory is switched off, see FIG. 3B), the current into the battery system 14 correspondingly increases (see FIG. 3C) and the system voltage increases by $\Delta V$ (see FIG. 3A) as a result. The amount of increase in voltage depends, among others, on the impedance of the battery system 14. When the impedance is high, $\Delta V$ is higher and vice versa. During cold days, or when the SoC of the battery system 14 is very low or very high, the impedance of the battery system, and thus $\Delta V$, will be high. There are also cases where the battery is nearly full and therefore the charge voltage is much closer to the maximum system voltage. This makes the system more sensitive to voltage fluctuations. As illustrated in FIG. 3A, when the system voltage increases above $V_{MAX}$ as a result of the current increase into the battery (i.e., $V_1+\Delta V>V_{MAX}$), the portion of the voltage that would be above $V_{MAX}$ is mitigated (e.g., trimmed, filtered, clamped, etc.) at the charger by reducing output current in close-loop to target $V_{MAX}$, and the voltage is maintained at $V_{MAX}$. Due to this current reduction at the charger, the increase in voltage seen by the battery system 14, due to the sudden load change, is correspondingly lower (see FIG. 3C). Thus, implementation of $V_{MAX}$ at the charger reduces the magnitude of the sudden increases in system voltage (and current) that results from the sudden change in load.

When the SECC 60 receives a new current request from the EVCC 50 that reflects the reduced load, the SECC 60 changes output (e.g., output voltage) to provide the lower requested current. However, because of the delays in data transfer between the EVCC 50 and the SECC 60, there will be a time lag between when the load on the bus 10 is switched off and when the current sourced from the charger changes (see FIG. 3A). If no other measures were in place, this delay would result in a period where voltage at the battery system was greater than desired. Since the maximum voltage limit $V_{MAX}$ is implemented in the charger 70, the charger can respond independently to manage voltage to the established VMAX and this time lag does not result in a significant increase in voltage at the battery system 14. It should be noted that, although $V_2$ is illustrated as having a value different from $V_1$ (in FIG. 3A), this is only exemplary. In general, $V_2$ may be equal to, greater than, or less than, $V_1$. Typically, when $I_{Battery}=0$ (i.e., charge current $I_{Charge}$ is only used to power onboard accessories), $V_1$ may be substantially equal to $V_2$, and when charge current is also used for battery charging, $V_1$ may not be equal to $V_2$.

Figure 4A:
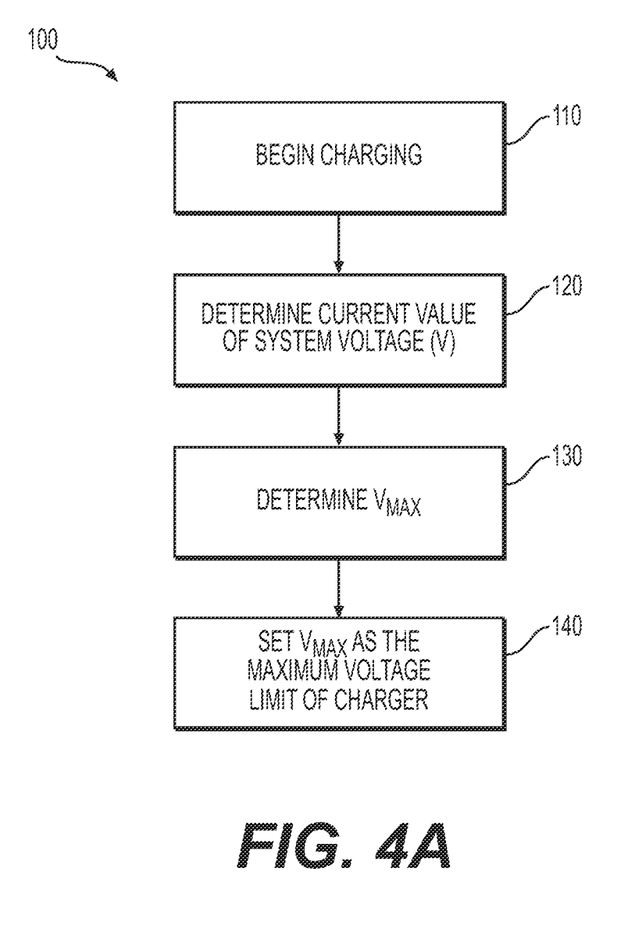
FIG. 4A is a flow chart that illustrates an exemplary method of implementing the maximum voltage limit during charging.

FIG. 4A is a flow chart that illustrates an exemplary method 100 of implementing a maximum voltage limit ($V_{MAX}$) on the charger 70. During charging of the bus 10 using charger 70 (step 110), the system voltage V of the battery system 14 is determined (step 120). The system voltage V may be determined in any manner. In some embodiments, the system voltage V may be determined by a controller (e.g., SECC 60) of the charger 70 based on a sensor (e.g., voltage sensor) input. In some embodiments, the system voltage V may be determined by the EVCC 50 (or another controller of the bus 10, such as a controller associated with the battery system 14) based on a sensor (e.g., voltage sensor) input. The value of the maximum voltage limit, $V_{MAX}$, is then determined (step 130). $V_{MAX}$ may be determined as a value higher than the system voltage V by a small value. For example, in some embodiments, $V_{MAX}$ may be determined as V+v, where v is an small value of voltage. The value of voltage (v) may depend on the application. In some embodiments, v may be an absolute value of voltage between about 2-20 Volts (e.g., about 2 volts, about 5 volts, about 10 Volts, about 15 Volts, about 20 Volts, etc.). In some embodiments, $V_{MAX}$ may be determined as a value higher than system voltage (V) by a fixed percentage of δ (i.e., $V_{MAX}=V+(V\times\delta\%)$. δ may have any value between about 2-10% (e.g., about 2%, about 5%, about 7%, about 10%, etc.). In general, $V_{MAX}$ may be determined at the bus 10 (e.g., by EVCC 50) or at the charger 70 (e.g., by SECC 60). In some embodiments, $V_{MAX}$ may be determined by the EVCC 50 and transmitted to the SECC 60. The determined $V_{MAX}$ may then be set as the maximum voltage limit of the charger 70 (step 140). In some embodiments, the value of $V_{MAX}$ may be programmed into the SECC 60 in step 140. After $V_{MAX}$ is set as the maximum voltage limit, when the system voltage increases due to a voltage surge (e.g., caused by a sudden change in electrical load at the bus 10), the maximum value of voltage (and resultant current) seen by the battery system 14 will be limited to $V_{MAX}$.

Figure 4B:
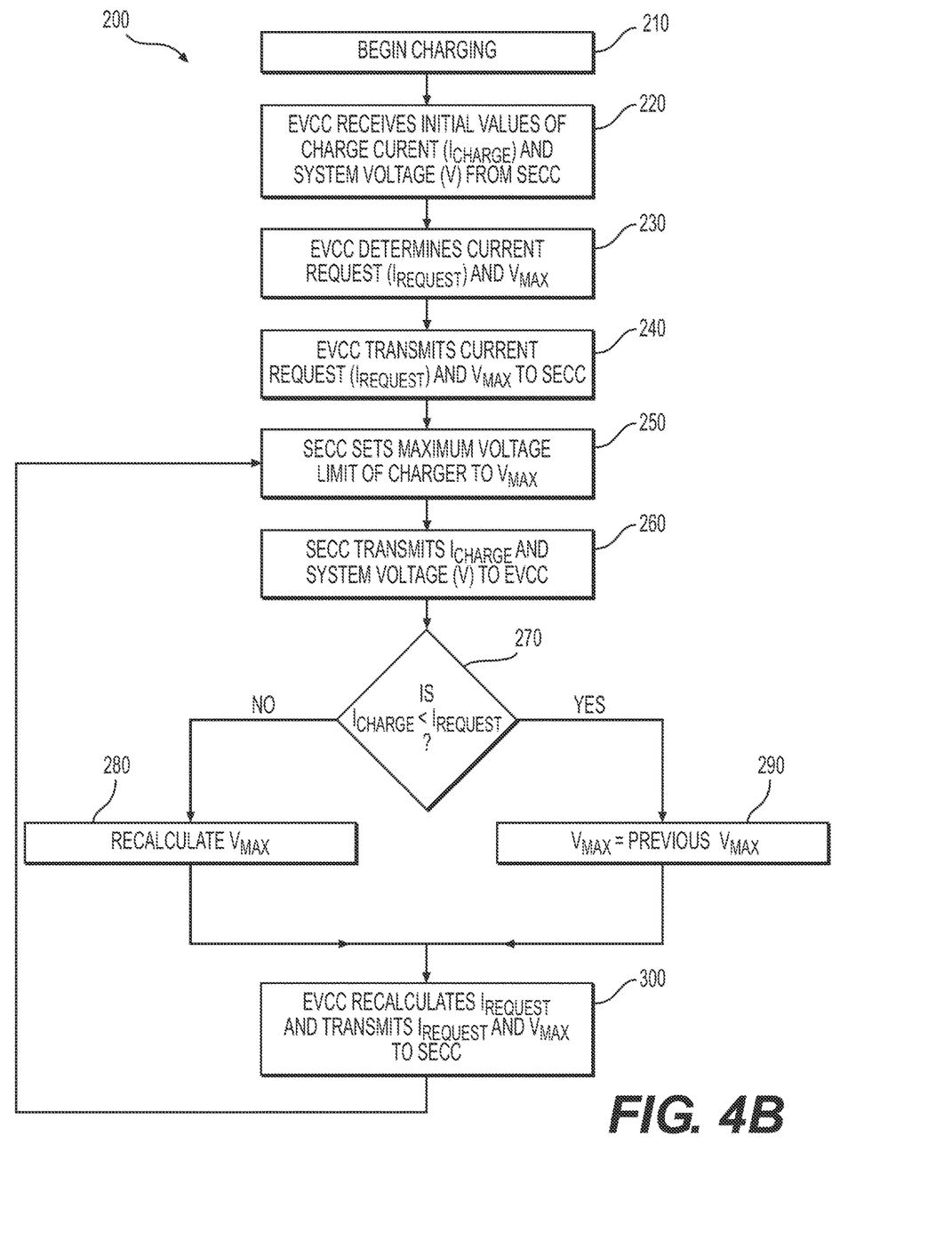
FIG. 4B is a flow chart that illustrates another exemplary method of implementing the maximum voltage limit during charging.

FIG. 4B is a flow chart that illustrates another exemplary method 200 of implementing a maximum voltage limit ($V_{MAX}$) on the charger 70. During charging (step 210), data indicative of the value of charge current ($I_{Charge}$) and system voltage (V), as determined by the SECC 60, are periodically received by the EVCC 50 from the SECC 60 (step 220). In some embodiments, these values may be based on inputs from sensors (e.g., voltage sensor, current sensor, etc.) in the charger 70. A portion of the charge current ($I_{Charge}$) received from the charger 70 may be used to charge the battery system 14 ($I_{Battery}$), and remainder may be used to power on-board accessories ($I_{Accessories}$). Based on the total current consumption of the bus 10 at that time, and the value of system voltage received from the SECC 60 (e.g., in step 220), the EVCC 50 calculates a current request, $I_{Request}$, and a maximum voltage limit $V_{MAX}$ (step 230). Current request ($I_{Request}$) may be determined as the sum of current being directed to the battery system 14 ($I_{Battery}$) (based on the charging strategy of the battery system 14) and the accessories ($I_{Accessories}$) (based on the accessory load at the moment $I_{Request}$ is calculated), i.e., $I_{Request} = I_{Battery}+I_{Accessories}$. If there are no accessories powered on at that time, $I_{Request}$ will be equal to $I_{Battery}$. And, if the battery system 14 is not consuming any power (e.g., the battery system 14 is fully charged, etc.) and only accessories are consuming power (e.g., heater 24 and HVAC system are on), $I_{Request}$ will be equal to $I_{Accessories}$. Based on the value of the system voltage (V) received from the SECC 60 (e.g., in step 220), EVCC 50 may determine $V_{MAX}$ similar to step 130 of FIG. 4A (i.e., as higher than the system voltage V by a small value). The calculated values of current request ($I_{Request}$) and $V_{MAX}$ are then transmitted by the EVCC 50 to the SECC 60 (step 240).

Upon receipt of $I_{Request}$ and $V_{MAX}$ from the EVCC 50, the SECC 60 sets $V_{MAX}$ as the maximum voltage limit of the charger 70 (step 250). The SECC 60 then directs charge current ($I_{charge}$) and the current system voltage (V) to the bus 10 via the charge port 16 (step 260). In some embodiments, the charge current ($I_{Charge}$) may be substantially equal to, or less than, the current request ($I_{Request}$) from the EVCC 50. The EVCC 50 may determine whether the value of current received by the bus 10 (i.e., $I_{Charge}$) is less than the current requested by the bus (i.e., $I_{Request}$) (i.e., if $I_{Charge}<I_{Request}$) (step 270). If it is not, (i.e., if $I_{Charge}=I_{Request}$, or step 270=No) EVCC 50 may determine $V_{MAX}$ as a value slightly higher than the current value of system voltage V received in step 260 (step 280) (similar to step 130 of FIG. 4A). The EVCC 50 then recalculates $I_{Request}$, and transmits the new values of $I_{Request}$ and $V_{MAX}$ to SECC 60 in step 300.

In step 270, if the value of the current received from the charger 70 ($I_{Charge}$) is less than the current requested by the EVCC 50 ($I_{Request}$) (i.e., Step 270=Yes), it indicates that the charger 70 is currently de-rating its output current (because of a system voltage surge). In that case, the maximum voltage limit $V_{MAX}$ of the charger 70 is left unchanged (step 290). The EVCC 50 then recalculates $I_{Request}$ and transmits the new value of $I_{Request}$ along with the unchanged value of $V_{MAX}$ to SECC 60 in step 300. The received value of $V_{MAX}$ is then set as the maximum voltage limit of the charger 70 (step 250). Thereafter, when an onboard accessory is turned off and the system voltage surges as a result, the charger 70 de-rates its output current such that $V_{MAX}$ is not violated, and the maximum value of voltage seen by the battery system 14 will be limited to $V_{MAX}$.

It should be noted that the order of the steps illustrated in FIGS. 4A and 4B is only exemplary, and the illustrated steps may be performed in any order. Further, although some of the steps of these figures are illustrated and described as being performed by the EVCC 50 or the SECC 60, this is only exemplary. In general, as would be recognized by a person skilled in the art, many of the steps illustrated FIGS. 4A and 4B may be performed at any location by any controller (e.g., by a controller of the charger 70, by a controller of the bus 10, or by controller of a remote control location that controls the charging of multiple chargers in a locality, etc.).

By implementing a maximum voltage limit (having a value slightly higher than the current system voltage) at the charger, the effect of a voltage surge (resulting from a transient load change on the bus) on the energy storage system is minimized. In general, the vehicle's control loop will dynamically change the current request, $I_{Request}$, to regulate the system voltage, depending on the charging strategy of the battery system 14. However, the delay time associated with the vehicle's voltage control loop (typically in the order of seconds) causes a voltage surge at the energy storage system. Compared to the delay time associated with the EVCC's (i.e., vehicle's) voltage control loop, the SECC's (i.e., charger's) voltage control loop is much faster (delay time in the order of milliseconds). Thus, using the charger voltage control loop to augment the EVCC's voltage control loop will minimize the effect of a voltage surge. In general, the disclosed system and method enables transient load changes on the bus to be handled efficiently during charging. The transient loads may be any type of load in the bus 10 that may be turned on or off during charging. Non-limiting examples of such loads may include, for example, heaters, compressors, lights, fans, AC, etc. that may be turned on/off while the bus 10 is charging. Typically, larger the load, higher will be potential voltage transient (e.g., Δ V in FIG. 3A), and higher the expected benefit of implementing the disclosed maximum voltage limit (e.g., $V_{MAX}$ in FIG. 3A).

While the current disclosure describes the charging of an electric bus through the charge port, it should be understood that the disclosure is not limited thereto. Rather, the principles described herein may be used to charge the bus 10 by any method. Further, although charging of an electric bus is described, the current disclosure may be applied to any electrical vehicle. For example, a maximum voltage limit, as described above, may be applied in an electric food truck that has deep fryers (or other appliances) turning on and off during charging. Similarly, a maximum voltage limit may be applied in an electric freezer truck that may have a freezer compressor (or other HVAC equipment) that turns on and off during charging. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A method of charging an electric vehicle, comprising:
   electrically connecting the electric vehicle to an external power source for charging;
   receiving data indicative of a system voltage of the power source during the charging;
   determining, by a controller of the electric vehicle, a maximum charging voltage limit received from the power source based on the received system voltage of the power source, the maximum charging voltage limit being the maximum permissible value of the system voltage to be received by the electric vehicle during the charging, wherein the maximum charging voltage limit is determined as a value higher than the received system voltage of the power source by a predetermined amount; and
   setting the determined maximum charging voltage limit as a limiting voltage of the power source.

2. The method of claim 1, wherein the receiving data includes receiving the data at the electric vehicle from the power source.

3. The method of claim 1, wherein determining the maximum charging voltage limit includes determining the maximum charging voltage limit at the electric vehicle.

4. The method of claim 3, further including transmitting the determined maximum charging voltage limit from the electric vehicle to the power source.

5. The method of claim 1, wherein determining the maximum charging voltage limit as equal to the received system voltage plus a predetermined value of voltage.

6. The method of claim 5, wherein the predetermined value of voltage is between about 2-20 Volts.

7. The method of claim 1, wherein the determined maximum charging voltage limit is a first voltage limit calculated based on a first system voltage value received from the power source, and wherein the method further includes determining a second voltage limit calculated based on a second system voltage value, different from the first system voltage value, received from the power source.

8. The method of claim 7, further including revising the set maximum charging voltage limit of the power source with the determined second voltage limit.

9. The method of claim 1, wherein setting the determined maximum charging voltage limit at the power source includes periodically changing the set maximum charging voltage limit of the power source based on values of the maximum charging voltage limit received from the electric vehicle.

10. A method of charging an electric vehicle, comprising:
    charging the electric vehicle using power from an external power source;
    receiving, at the electric vehicle, data indicative of a system voltage of the power source during the charging;
    determining, at the electric vehicle, a maximum charging voltage limit received from the power source as a value higher than the received system voltage of the power source by a predetermined amount, the maximum charging voltage limit being the maximum permissible value of the system voltage of the power source to be received by the electric vehicle during the charging;
    transmitting the determined maximum charging voltage limit from the electric vehicle to the power source; and
    setting the determined maximum charging voltage limit as a limiting voltage of the power source.

11. The method of claim 10, wherein determining the maximum charging voltage limit includes determining the maximum charging voltage limit as equal to the received system voltage plus a predetermined value of voltage.

12. The method of claim 11, wherein the predetermined value of voltage is between about 2-20 Volts.

13. The method of claim 10, wherein the receiving includes periodically receiving data indicative of the current system voltage of the power source during the charging.

14. The method of claim 13, wherein determining the maximum charging voltage limit includes determining a revised value of the maximum charging voltage limit based on updated system voltage data received from the power source.

15. A method of charging an electric vehicle, comprising:
charging the electric vehicle using power from an external power source;
receiving first data, the first data being indicative of a system voltage of the power source at a first time during the charging;
determining, by a controller of the electric vehicle, a maximum charging voltage limit received from the power source based on the received first data, the maximum charging voltage limit being the maximum permissible value of the power source system voltage to be received by the electric vehicle during the charging;
setting the determined maximum charging voltage limit as a limiting voltage of the power source;
receiving second data, the second data being indicative of the power source system voltage at a second time during the charging, the second time being later than the first time;
determining a revised maximum charging voltage limit based on the received second data; and
updating the power source maximum charging voltage limit using the determined revised maximum charging voltage limit.

16. The method of claim 15, wherein determining the maximum charging voltage limit based on the received first data includes determining the maximum charging voltage limit as equal to the system voltage of the power source at the first time plus a predetermined value of voltage.

17. The method of claim 16, wherein the predetermined value of voltage is between about 2-20 Volts.

18. The method of claim 15, charging the electric vehicle includes operating an accessory on board the electric vehicle using power from the power source during the charging.

19. The method of claim 15, wherein the electric vehicle is a bus.

\* \* \* \* \*